G. P. HERNDON.
Ice-Cream Freezers.

No. 149,476. Patented April 7, 1874.

WITNESSES:
Solon C. Kemon
Edw. V. Benton

INVENTOR:—
Geo. P. Herndon
BY
ATTORNEYS.

UNITED STATES PATENT OFFICE.

GEORGE P. HERNDON, OF TUPELO, MISSISSIPPI.

IMPROVEMENT IN ICE-CREAM FREEZERS.

Specification forming part of Letters Patent No. 149,476, dated April 7, 1874; application filed March 16, 1874.

*To all whom it may concern:*

Be it known that I, GEORGE P. HERNDON, of Tupelo, in the county of Lee and the State of Mississippi, have invented a new and Improved Ice-Cream Freezer; and I do hereby declare that the following is a full, clear, and exact description of the same, reference being had to the accompanying drawing forming a part of this specification, in which—

Figure 1:
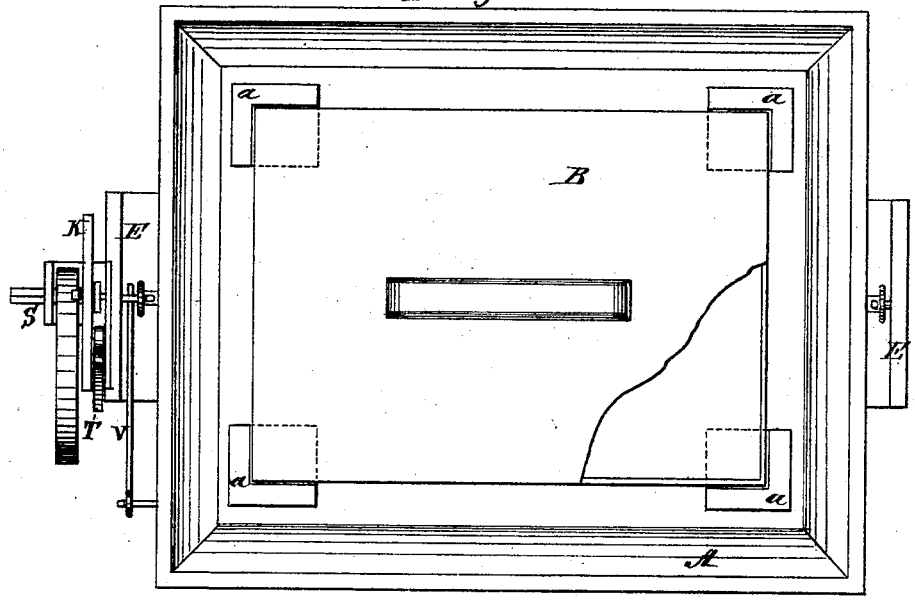
Figure 2:
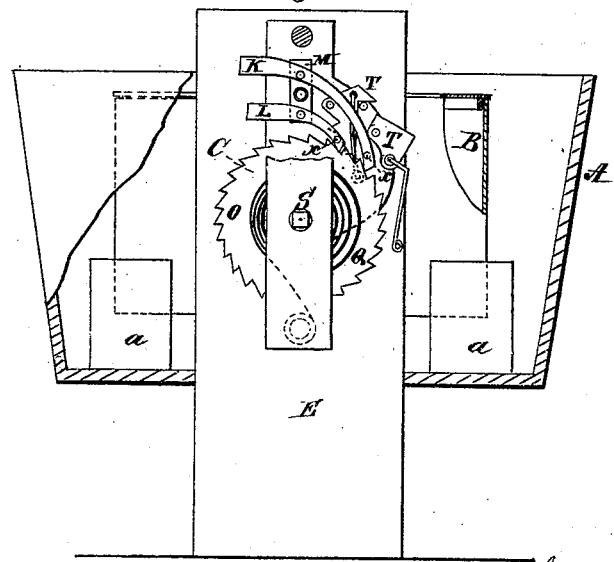

Figure 1 is a top plan view, and Fig. 2 a partly sectional end elevation of the apparatus.

The invention has for its object to furnish an improved automatic freezer; and consists in a vibrating tub or vessel containing the sheet-metal cream-holder, between which a space is formed to receive the ice, and in the peculiar mechanism for imparting the vibratory movement, as hereinafter described.

In the drawing, A indicates the outer wooden box or vessel for containing the ice; B, the tin cream-holder, and C the spring motor for vibrating them. The box A is suspended by suitable devices between the standards E E, so that when it is vibrated the bottom thereof moves through the arc of a circle described from the point of pivotal connection with the standards. The covered cream-holder B is sufficiently smaller than the box A to leave a space between them on the side for the reception of a suitable quantity of ice, and it is supported above the bottom of said box by means of notched or rabbeted blocks *a*, which prevent its lateral movement, but allow its ready or convenient removal.

In practical operation the holder B will be about one-third filled with cream, and the space between it and box A with ice to a higher point. As the box A is vibrated the cream is thrown upon the sides of the holder alternately, and the thin stratum which adheres to either side at each succeeding vibration is almost instantly chilled or reduced to a lower temperature than the main body of cream, and thus as the stratums multiply and are superposed the depth of the cream in the center of the vessel diminishes correspondingly, until at last the whole mass is frozen to the requisite degree. The time occupied in freezing a quantity adapted for a full-sized machine is about ten minutes.

To form the motor C, I employ a pair of weighted pawls, K L, pivoted in an oscillating frame, M, in conjunction with the ordinary form of escapement-wheel O, spiral or clock spring Q, a ratchet, and winding-post S. The pawl K is pivoted above the other one, L, and is hence made longer to adapt it to engage the escapement-wheel. Each pawl has a pin, X, projecting laterally from its lower end, which comes in contact with a pivoted spring-actuated block or lever, T, at each oscillation of the frame M, and is, by such device T, caused to re-engage with the escapement-wheel at each return movement of said frame. The frame oscillates correspondingly with the box A, and is connected with the latter by a bent rod or lever V.

The spring of the motor mechanism being wound up, the box A will be powerfully vibrated, and thus much of the manual labor ordinarily attending the manufacture of ice-cream is avoided.

Having thus described my invention, what I claim is—

1. The combination of the vibrating box A, suspended from pivots, as shown, and the sheet-metal cream-holder B supported within it, and arranged to leave an ice-chamber or space on the sides and bottom, as set forth.

2. In the mechanism for operating the box A through the medium of the rod or lever V, the combination of the weighted pawls K L, with laterally-projecting pins X, the pivoted spring-actuated levers T T, oscillating frame M, and the escapement-wheel, ratchet, and spring, all operating as shown and described.

GEO. P. HERNDON.

Witnesses:
JNO. G. HERNDON,
FRANK M. COKER.